(12) United States Patent
Ren et al.

(10) Patent No.: US 8,471,732 B2
(45) Date of Patent: Jun. 25, 2013

(54) METHOD FOR RE-USING PHOTOREALISTIC 3D LANDMARKS FOR NONPHOTOREALISTIC 3D MAPS

(75) Inventors: Liu Ren, Cupertino, CA (US); Lincan Zou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 740 days.

(21) Appl. No.: 12/637,148

(22) Filed: Dec. 14, 2009

(65) Prior Publication Data

US 2011/0140928 A1 Jun. 16, 2011

(51) Int. Cl.
*G08G 1/123* (2006.01)

(52) U.S. Cl.
USPC .......... 340/995.24; 340/995.27; 345/419; 345/420; 345/582; 345/619; 345/625; 345/634; 345/653; 701/426; 701/436

(58) Field of Classification Search
USPC ... 340/995.19, 995.24, 995.27, 995.2; 345/582, 345/633, 426, 420, 419, 589, 619, 634, 625, 345/646, 653; 382/181, 204, 276; 701/209, 701/211, 207, 426, 436
See application file for complete search history.

(56) References Cited

U.S. PATENT DOCUMENTS

| | | | | |
|---|---|---|---|---|
| 7,639,250 | B2 * | 12/2009 | Xu et al. | 345/419 |
| 2002/0075276 | A1 * | 6/2002 | Lake et al. | 345/582 |
| 2004/0240741 | A1 | 12/2004 | Aliaga et al. | |
| 2006/0287819 | A1 * | 12/2006 | Brulle-Drews et al. | 701/211 |
| 2008/0062173 | A1 | 3/2008 | Tashiro | |
| 2009/0113296 | A1 | 4/2009 | Lacy et al. | |
| 2010/0274478 | A1 * | 10/2010 | Takahashi | 701/201 |
| 2012/0062395 | A1 * | 3/2012 | Sonnabend et al. | 340/932.2 |

FOREIGN PATENT DOCUMENTS

WO 2009098154 A1 8/2009

OTHER PUBLICATIONS

Hekmatzada D et al: "Non-Photorealistic Rendering of Complex 3D Models on Mobile Devises", 8th Annual Conference of the International Association for Mathematical Geology: IAMG 2002 Sep. 15-20, 2002 Berlin, Germany, [Online] Sep. 15, 2002, pp. 1-6, XP002614606, Retrieved from the Internet: URL: http://cg.cs.uni-bonn.de/docs/publications/202/hekmatzada-2002-NPRon PDA.pdf [treieved on Dec. 15, 2010].

Jahnke M et al: "Non-photorealistic Rendering on Mobile Devices and its Usability Concerns", International Conference on Developments in Visualization and Virtual Environmental in Geographic Information Science, Jan. 7-8, 2008, [Online] Jan. 7, 2008, pp. 1-11, XP002614607, Retrieved from the Internet: URL:http://www.iseis.cuhk.edu.hk/downloads/vge/34.pdf [retrieved on Dec. 15, 2010].

(Continued)

*Primary Examiner* — Brent Swarthout
(74) *Attorney, Agent, or Firm* — Taft Stettinius & Hollister LLP

(57) ABSTRACT

A method of displaying a navigation map includes preprocessing photorealistic three-dimensional data offline. A location of a vehicle is automatically determined online. A portion of the preprocessed photorealistic three-dimensional data is identified that is associated with objects that are disposed within a geographic area. The geographic area includes the location of the vehicle. A nonphotorealistic image is rendered based on the identified portion of the preprocessed data. The nonphotorealistic image is electronically displayed to a user within the vehicle.

15 Claims, 24 Drawing Sheets

OTHER PUBLICATIONS

McGuire Max: "The Half-Edge Data Structure", Aug. 7, 2000, XP002648540, Retrieved from the Internet: URL: http://flipcode.com/archives/The_Half-Edge_Data_Structure.shtml [retrieved on Jul. 8, 2011].

Christos Gatzikis, et al.; "Evaluation of Non-Photorealistic 3D Urban Models for Mobile Device Navigation"; Jul. 19, 2009; Virtual and Mixed Reality, Springer Berlin Heidelberg; Berlin, Heidelberg; pp. 169-178; XP019123127; ISBN: 978-3-642-02770-3; Bournemouth University, Talbot Campus, Poole, UK; CIty University, London, UK; 10 pages.

Adam Lake, Carl Marshall, Mark Harris and Marc Blackstein, "Stylized Rendering Techniques for Scalable Real-Time 3D Animation," NPAR 2000: Proceedings of the First International Symposium on Non-Photorealistic Animation and Rendering, 2000; Graphics Algorithms and 3D Technologies Group (G3D), Intel Architecture Labs (IAL), University of North Carolina at Chapel Hill. (10 pages).

Hyunjun Lee, Sungtae Kwon, and Seungyong Lee, "Real-Time Pencil Rendering," NPAR 2006: Proceedings of the First International Symposium on Non-Photorealistic Animation and Rendering, 2006; Postech. (9 pages).

Bert Freudenberg, Maic Masuch, and Thomas Strothotte, "Walk-Through Illustrations: Frame-Coherent Pen-and-Ink Style in a Game Engine," Eurographics Assn. 2001; Blackwell Publishers, Oxford UK/ Massachusetts USA 2001. (8 pages).

Y.I.H Parish, P. Muller; Eth Zurich, Switzerland; Central Pictures, Switzerland; "Procedural Modeling of Cities," in Proceedings of ACM SIGGRAPH 2001. (8 pages).

P. Wonka, M. Wimmer, F. Sillion, W. Ribarsky; Georgia Institute of Technology; Vienna University of Technology; INRIA; "Instant Architecture," ACM Transactions on Graphics 22, 3, 669-677; 2003. (9 pages).

P. Muller, P. Wonka, S. Haegler, A. Ulmer, L.V. Gool; ETH Zurich/K.U. Leuven; Arizona State University; "Procedural Modeling of Buildings," in Proceedings of ACM SIGGRAPH, 2006. (10 pages).

J.D. Northrup and Lee Markosian; Brown University, Providence, RI; "Artistic Silhouettes: A Hybrid Approach," International Symposium on Non-Photorealistic Animation and Rendering (NPAR), 2000. (7 pages).

D. DeCarlo, S. Rusinkiewicz; Rutgers University, Princeton University; "Highlight Lines for Conveying Shape," International Symposium on Non-Photorealistic Animation and Rendering (NPAR), Aug. 2007. (8 pages).

L. Markosian, M. Kowalski, S. Trychin, L. Bourdev, D. Goldstein, J. Hughes; Brown University site of the NSF Science and Technology Center for Computer Graphics and Scientific Visualization; Providence, RI; "Real-Time Nonphotorealistic Rendering," Computer Graphics (Proceedings of SIGGRAPH 1997); Aug. 1997. (6 pages).

\* cited by examiner

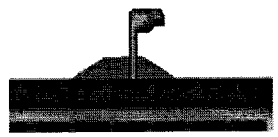
FIG. 5b
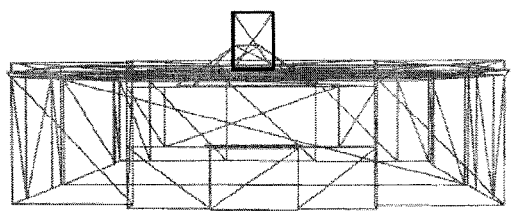
FIG. 5a
FIG. 5c

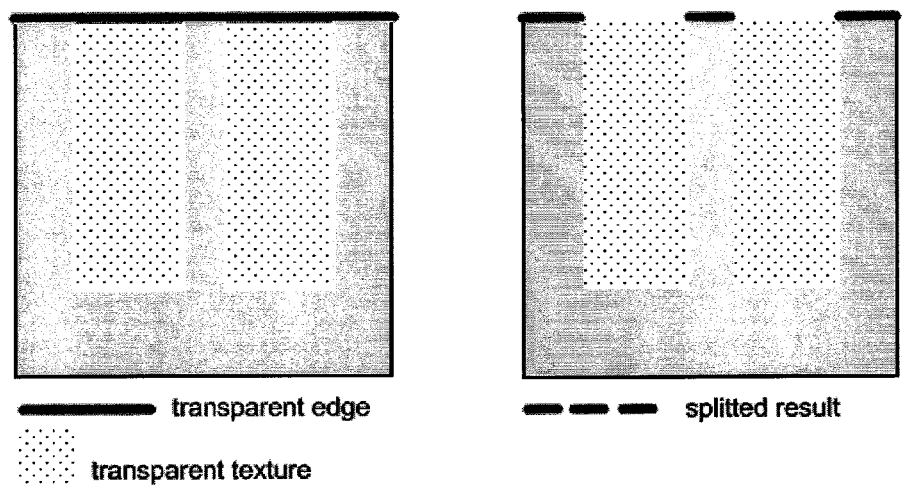
FIG. 6a                    FIG. 6b

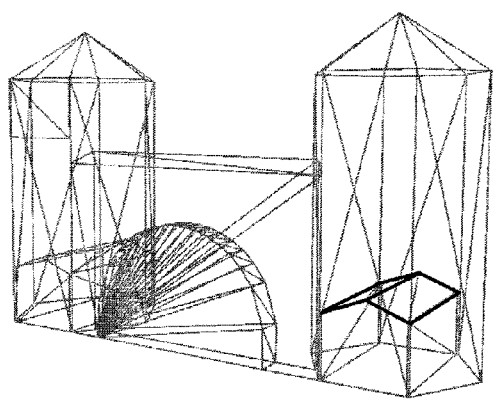
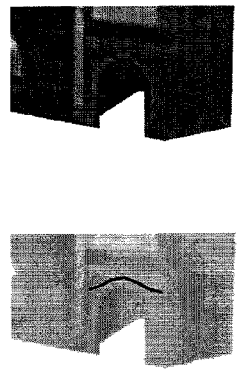
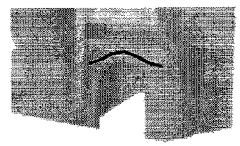
FIG. 7b
FIG. 7c
FIG. 7a

Marking rules

| Mark / Orientation | FIX | TBD | SKIP |
|---|---|---|---|
| Vertical | (FIX_VER_MIN, FIX_VER_MAX) | (TBD_VER_MIN, TBD_VER_MAX) | Otherwise |
| Horizontal | (FIX_HOR_MIN, FIX_HOR_MAX) | (TBD_HOR_MIN, TBD_HOR_MAX) | Otherwise |
| Other orientations | (FIX_OBL_MIN, FIX_OBL_MAX) | (TBD_OBL_MIN, TBD_OBL_MAX) | Otherwise |

Note: (FIX_VER_MIN, FIX_VER_MAX) = (0, 150), (TBD_VER_MIN, TBD_VER_MAX) = (150, 179), (FIX_HOR_MIN, FIX_HOR_MAX) = (1, 171), (TBD_HOR_MIN, TBD_HOR_MAX) = (171, 179), (FIX_OBL_MIN, FIX_OBL_MAX) = (2, 120) , (TBD_OBL_MIN, TBD_OBL_MAX) = (120, 175)

FIG. 14

FIG. 15a
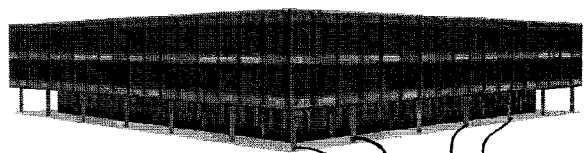
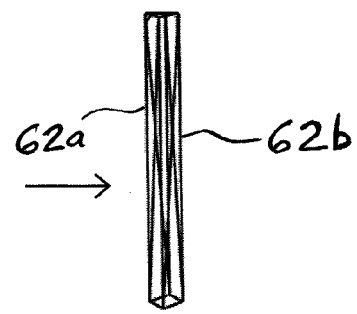
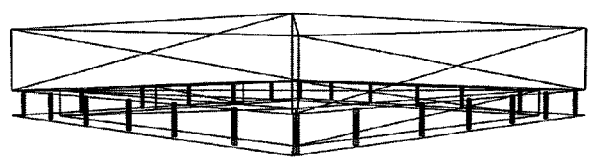
FIG. 15b        FIG. 15c

FIG. 16a
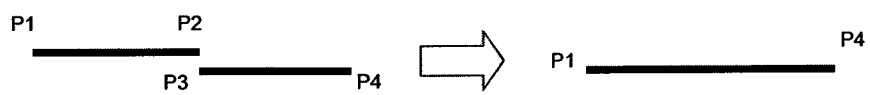
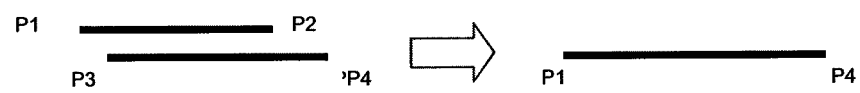
FIG. 16b

METHOD FOR RE-USING PHOTOREALISTIC 3D LANDMARKS FOR NONPHOTOREALISTIC 3D MAPS

BACKGROUND OF THE INVENTION

1. Field of the Invention

The present invention relates to electronic navigation maps, and, more particularly, to rendering images for electronic navigation maps.

2. Description of the Related Art

Navigation maps are essential resources for visitors to an unfamiliar city because these maps visually highlight landmarks including buildings, natural features, and points of interest (POIs) such as museums, restaurants, parks and shopping districts. While most in-car and portable navigation devices (PNDs) rely on two-dimensional (2D) navigation maps to visualize these landmarks in 2D, three-dimensional (3D) in-car navigation systems are emerging. Most of these 3D navigation systems use photorealistic rendering techniques to visualize 3D landmarks. In this visualization scheme, precise geometry models and detailed photorealistic building textures are needed. These systems require that the appearances of these rendered 3D buildings, roads or other objects match those of the real buildings, roads or other objects as much as possible. Thus, when a driver sees the real 3D buildings through the windshield, he or she could do a photorealistic match to recognize the 3D landmark. On one hand, a 2D navigation system visualizes almost no details of our 3D world. On the other hand, a navigation system based on photorealistic 3D maps tries to visualize every detail of our 3D world, which could be unnecessary.

Most data providers (e.g., Tele Atlas) provide only 3D map element data (e.g., 3D landmarks) that are suitable for direct photorealistic rendering. More particularly, most 3D map element data is provided in the form of polygon meshes attached with photorealistic textures. If no modifications are made, these data can only be used for direct photorealistic rendering. Therefore, these data are not suitable for direct nonphotorealistic rendering (NPR). However, NPR has advantages over photorealistic rending in that NPR may present images in a concise way (without unnecessary details) such that the user can easily match the renderings to the real-life views that he observes, and yet only a low level of computational resources is required to produce the NPR renderings.

What is neither disclosed nor suggested by the prior art is a method for presenting NPR renderings of buildings, landmarks and other 3D objects on a navigation map by use of conventional, commercially available 3D map element data that is intended for photorealistic rendering.

SUMMARY OF THE INVENTION

The present invention may provide a 3D navigation system that bridges the gap between traditional 2D navigation maps and photorealistic 3D maps by visualizing and highlighting only important details for navigation by using non-photorealistic (NPR) or expressive rendering techniques. According to the invention, available photorealistic 3D landmark data may be re-used for expressive visualization in NPR 3D navigation maps. More particularly, the photorealistic 3D landmark data may be first processed offline and then non-photorealistic rendering may be applied at runtime to achieve high performance.

Because processing of the photorealistic 3D landmark data may be computationally intensive, preprocessing of the photorealistic data may be performed offline. In other words, all of the photorealistic data may be received in advance of the rendering of the NPR display. More particularly, preprocessing may be performed on the photorealistic data, and preprocessed 3D map data which contains some NPR information (NPR edges and NPR textures) may be prepared in advance of the rendering of the image to the user. Then, during driving, the preprocessed 3D map data may be received with the edges already identified and the textures already converted. During driving, the user may receive this data from a disk, CD, storage device or the internet. Of course, some special rendering processing may be performed in real time in order to prepare the data with NPR information for presentation of NPR images to the driver.

It is also possible, in another embodiment, for photorealistic data to be received during driving, and for the conversion to nonphotorealistic data to be performed during driving. However, because of the processing of photorealistic data is computationally intensive, a lot of processing hardware may be called for.

The invention comprises, in one form thereof, a method of displaying a navigation map including preprocessing photorealistic three-dimensional data offline. A location of a vehicle is automatically determined online. A portion of the preprocessed photorealistic three-dimensional data is identified that is associated with objects that are disposed within a geographic area. The geographic area includes the location of the vehicle. A nonphotorealistic image is rendered based on the identified portion of the preprocessed data. The nonphotorealistic image is electronically displayed to a user within the vehicle.

The invention comprises, in another form thereof, a method of displaying a navigation map including automatically determining a location of a vehicle. Photorealistic three-dimensional data is received. The data is associated with objects that are disposed within a geographic area. The geographic area includes the location of the vehicle. Edges of the objects in the photorealistic data are automatically identified and nonphotorealistically rendered. Photorealistic texture in the photorealistic data is converted into nonphotorealistic texture. A nonphotorealistic image of the object is produced based upon the nonphotorealistic texture, the marked edges and a width value for each of the edges in the data. The nonphotorealistic image is electronically displayed to a user within the vehicle.

The invention comprises, in yet another form thereof, a 3D landmark processing method including detecting and splitting transparent edges and internal edges of objects in the photorealistic three-dimensional data associated with the objects. Non-transparent edges, non-internal edges and the split edges of the objects in the photorealistic data are used to construct a Complete Half Edge Structure. Each of the edges in the Complete Half Edge Structure is discarded, marked as a view-independent edge, or marked as a view-dependent edge. Substructures within the Complete Half Edge Structure are identified. The marking of at least one of the substructures is updated based on a type of the substructure. Redundant ones of the edges in the Complete Half Edge Structure are merged to thereby produce a final set of NPR edges for online rendering. A width value is computed for each of the edges in the final set. Photorealistic texture in the photorealistic data is converted into nonphotorealistic texture. A nonphotorealistic image of the object is produced based upon the nonphotorealistic texture, the final set of nonphotographically rendered edges, the markings of each of the edges in the final set, and the width value for each of the edges in the final set. Each of the edges in the final set are marked as either a view-independent edge or a view-dependent edge.

An advantage of the present invention is that NPR rendering techniques can provide simpler and more expressive visualizations as compared with photorealistic rendering techniques.

Another advantage of the present invention is that, as compared with existing photorealistic 3D navigation systems, NPR 3D maps for 3D in-car navigations improve driver orientation and landmark recognition. A 3D map may improve driver orientation as compared with a 2D map by nature as people live in a 3D world. However, photorealistic 3D rendering may provide too many details, which could introduce unnecessary distractions for navigation purposes. NPR rendering may solve this problem by highlighting the most important features (e.g., shape, depth cues, color variation) of 3D objects for recognition and omitting subtle details.

Yet another advantage of the present invention is that, as compared with existing photorealistic 3D navigation systems, NPR 3D maps for 3D in-car navigations may reduce the need for map updates. The details of the real 3D world may change frequently. A photorealistic 3D map may request frequent map updates to synchronize and be consistent with these changes. These updates could be a burden for both end users and data providers. As NPR provides simpler and expressive visualization of the 3D world, the map updates may be greatly reduced.

A further advantage of the present invention is that, as compared with existing photorealistic 3D navigation systems, NPR 3D maps for 3D in-car navigations may reduce cognitive load by avoiding "photorealistic match". When using a photorealistic 3D map, the user could tend to match all the details of rendered 3D objects with those in the real world as photorealistic 3D maps raise the user's expectation of photorealism. Depending on the degree of photorealism, it may take the user a longer time to match all the details (photorealistic match). On the contrary, the user can avoid "photorealistic match" when a NPR 3D map is used. For example, if a post office is always rendered with a certain style (e.g., specific NPR effects), the user could quickly accept and comprehend the fact that the building is a post office instead of thinking and matching the appearance of a photorealisticly rendered post office with that of the real post office building.

Still another advantage of the present invention is that, as compared with existing photorealistic 3D navigation systems, NPR 3D maps for 3D in-car navigations may be more appealing to the user. NPR 3D maps may be very attractive given the artistic effects provided by different NPR styles. Furthermore, as different users have different preferences, each user could choose and put into effect his favorite rendering styles for the 3D navigation maps.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 5a is an example of a polygon mesh including a rectangular transparent edge.

FIG. 5b is an example of a fragmentary rendering of the mesh of FIG. 5a in which the transparent edge is not rendered.

FIG. 5c is an example of a fragmentary rendering of the mesh of FIG. 5a in which the transparent edge is rendered.

FIG. 6a illustrates an example of a transparent edge.

FIG. 6b illustrates the splitted result of the transparent edge of FIG. 6a.

FIG. 7a illustrates internal edges in a 3D landmark polygon mesh.

FIG. 7b illustrates a fragmentary rending of the mesh of FIG. 7a in which the internal edge is not rendered.

FIG. 7c illustrates a fragmentary rending of the mesh of FIG. 7a in which the internal edge is in fact rendered.

FIG. 9b illustrates two border edges of the irregular topology of FIG. 9a.

FIG. 13b is a plan view illustrating computation of a dihedral angle according to the embodiment of FIG. 13a.

FIG. 14 is a table of marking rules according to one embodiment of the invention.

FIG. 15a is an example rendering of a 3D landmark building.

FIG. 15b is a 3D landmark polygon mesh based upon the rendering of FIG. 15a.

FIG. 15c is a 3D polygon mesh of a pillar included in the mesh of FIG. 15b.

FIG. 16a is an illustration of merging of two adjacent edges.

FIG. 16b is an illustration of merging of two partially overlapping edges.

Figure 1:
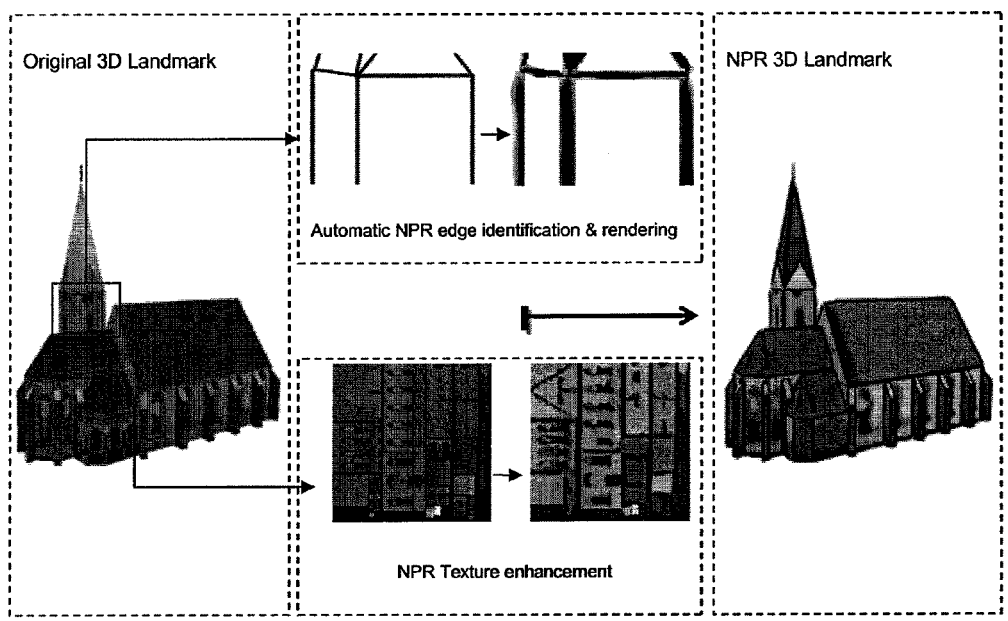
FIG. 1 is a flow diagram illustrating two components of one embodiment of an offline conversion of photorealistic 3D landmark to NPR style 3D landmark for online NPR rendering of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The invention may provide a method of 3D navigation using NPR 3D maps, including stylized visualization for the 3D objects in a navigation map. The 3D objects displayed on a 3D navigation map may include buildings, landmarks, POIs, hazard spots, and roads. The NPR 3D maps may be created based on 3D object data that may be generated in different ways. The 3D data may be offered by a data provider in a format suitable for only photorealistic rendering (for example, polygon meshes with photorealistic textures). In this case, such data may be enhanced for NPR rendering.

Referring now to the drawings, and particularly to FIG. 1, there are illustrated two components of one embodiment of a method of converting photorealistic 3D landmarks to NPR style 3D landmarks of the present invention that may be used within a vehicle, such as an automobile, boat, airplane, etc. One of the components of the method is automatic NPR edge identification and rendering in which important edges in the data are automatically identified and NPR rendered. This may be needed for NPR style visualization. The other of the components is NPR texture enhancement in which contrasts in colors between different sections of the data may be exaggerated and/or enhanced. The textures included in the photorealistic 3D landmark data may be designed to improve photorealism but may not be suitable for NPR rendering. Image processing algorithms may be applied in order to change the appearance of these textures so that they may have NPR style appearance. Typical NPR styles may include cartoon style, pen-and-ink style, pencil hatching style, etc.

Figure 2:
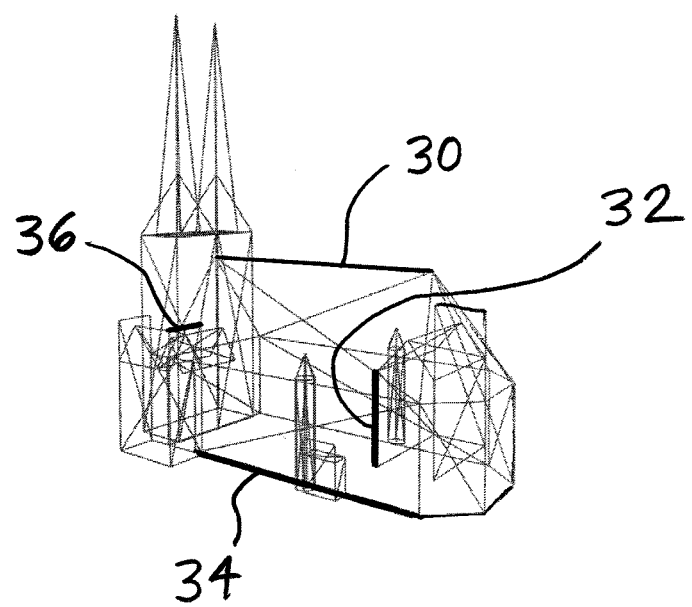
FIG. 2 is an example of the raw geometry of 3D landmark data containing different types of edges that may be identified via an algorithm of the present invention.

FIG. 2 illustrates the raw geometry of 3D landmark data, which contain different types of edges (e.g., surface edges, internal edges, border edges, transparent edges, etc.). Examples of each of these types of edges in FIG. 2 include a surface edge 30, an internal edge 32, a border edge 34 and a transparent edge 36. For 3D buildings, typical NPR rendering styles (pen-and-ink, cartoon style, etc.) call for the important edges or NPR edges of a 3D building to be highlighted to convey the shape information. The algorithm of the invention may be able to identify these NPR edges successfully. Once these edges are identified, stroke rendering techniques (e.g., sprites, billboards) may be employed to render these edges to achieve hand-drawn NPR effects. Once the shape of the 3D building is illustrated, the building texture may need to be enhanced to have a complete NPR look. The second component of the inventive algorithm ("NPR texture enhancements") may fulfill this task.

Figure 3A:
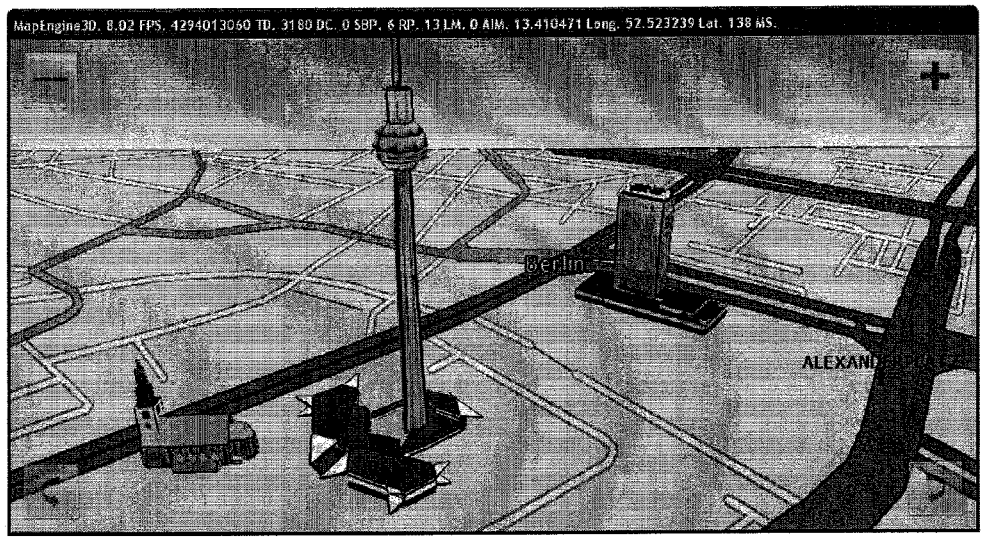
FIG. 3a is one example of an NPR 3D map rendering that may be produced by a method of the present invention.
Figure 3B:
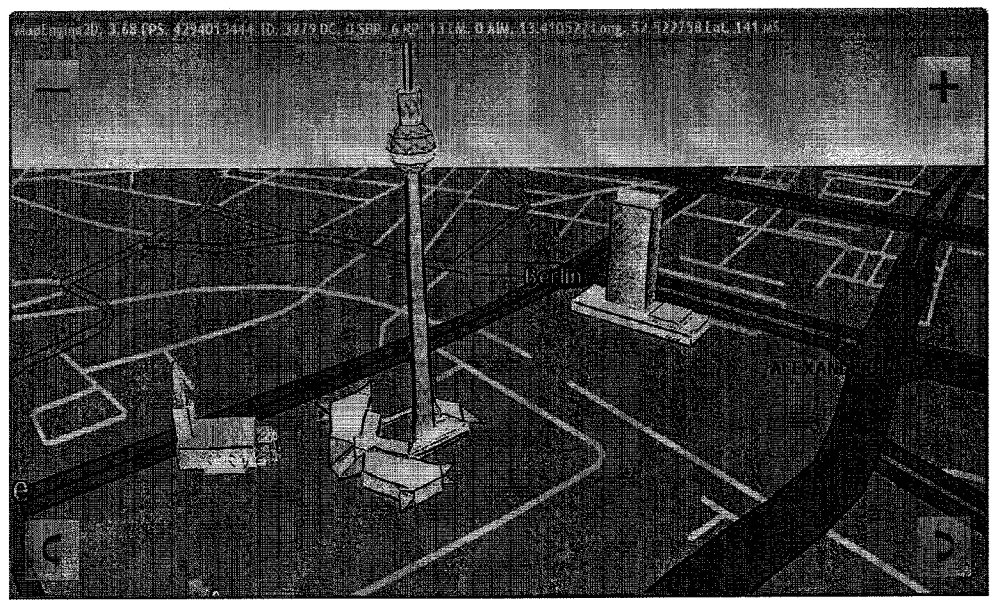
FIG. 3b is another example of an NPR 3D map rendering that may be produced by a method of the present invention.

In FIGS. 3a and 3b are two examples of how the appearance of 3D landmarks may be enhanced for nonphotorealistic 3D maps by use of the invention. That is, in FIGS. 3a and 3b, the inventive method has been applied to render NPR style 3D landmarks in a nonphotorealistic 3D map system. The same 3D landmarks are rendered with two different styles in FIGS. 3a and 3b, respectively.

The inventive NPR edge identification algorithm may be used to process the original raw 3D landmark data offline. The outputs of the algorithm may include marked edges for NPR style enhancement. In particular, these edges may be highlighted during online NPR rendering. In addition, the algorithm may also pre-compute some important attributes (e.g., edge width, etc.) for each marked NPR edge. All these pieces of information may be used to speed up the NPR edge rendering process at runtime. Even though important edge detection (including silhouette edge detection) is an important topic for NPR rendering, the focus is mostly on water-tight surfaces, where 3D geometry and topology are quite regular. The algorithm of the invention may need to detect these important edges for typical 3D buildings, in which case the 3D mesh structures are usually not clean or regular. First, the inventive NPR edge identification algorithm may need to deal with 3D building data with edges or structures inside the surface. Second, the building geometry is typically modeled by separate parts, such as walls, roofs, etc. As a result, building models usually contain irregular topologies. Finally, some additional geometric structures of the building could be represented by isolated texture quads in the 3D data, which may call for specific processing in the inventive algorithm. Another possible feature of the inventive NPR edge detection algorithm is that domain knowledge may be used to facilitate NPR edge identification. For example, because the inputs of the inventive algorithms may be limited to 3D buildings, the algorithm may automatically identify sub-structures (e.g., pillars) of the building to facilitate automatic NPR edge detection.

Figure 4:
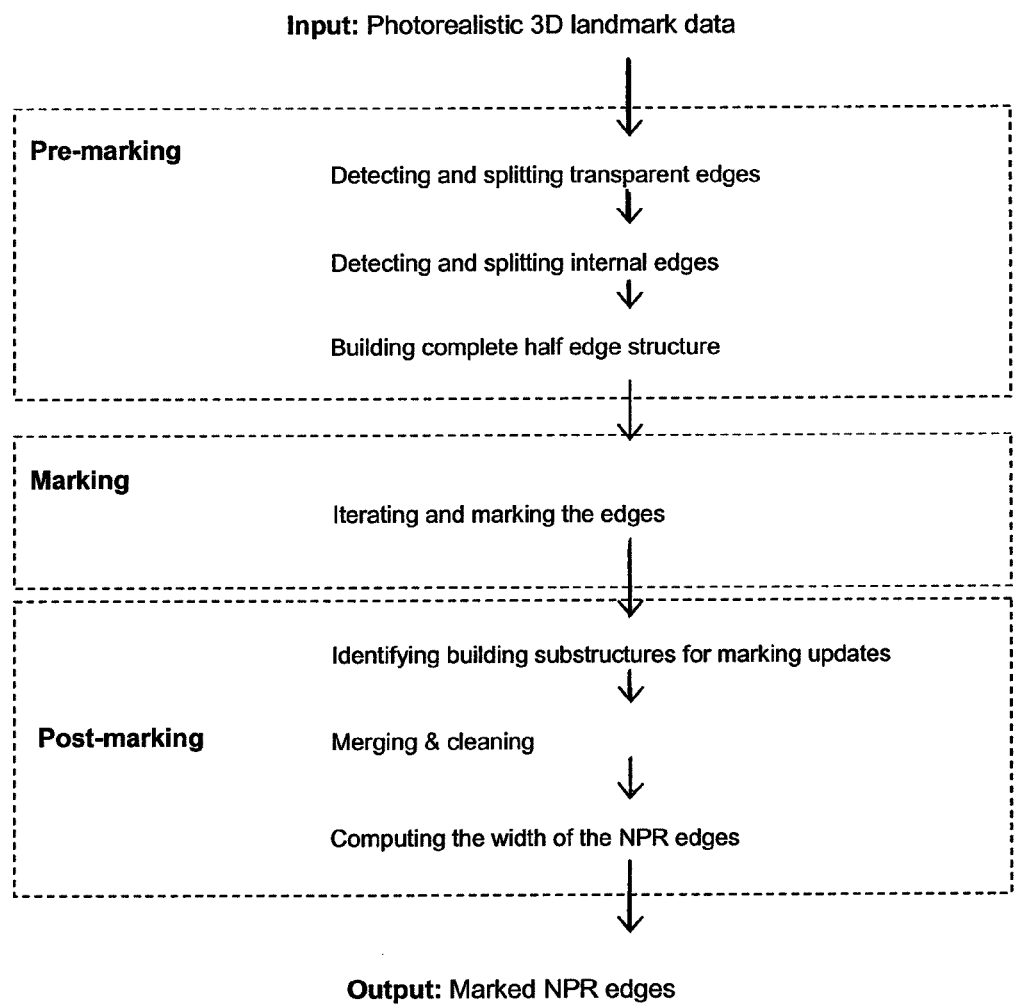
FIG. 4 is a flow chart of one embodiment of an NPR edge identification algorithm of the present invention.

Illustrated in FIG. 4 is an overview of one embodiment of the inventive NPR edge identification algorithm. The algorithm may have three main stages including pre-marking, marking and post-marking. The input may be photorealistic 3D landmark data. The geometry part can be stored in two buffers, namely, a vertex buffer and an index buffer. The vertex buffer may contain all the vertices of the mesh. The index buffer may be used to construct faces (triangles) for the mesh, and these faces may represent the topologies of a 3D building model. During the first stage of pre-marking, the transparent edges and the internal edges of the landmark may be detected and splitted. All of the landmark's edges, including the original ones and the splitted ones, may be used in constructing a data structure called Complete Half Edge Structure (CHES).

Based on CHES, the inventive NPR edge identification algorithm may iterate all the edges and perform the marking operation. In this process, some edges may be discarded and others may be marked as either "TBD" or "FIX." "FIX" may indicate view-independent NPR edges. These edges may be rendered during runtime independent of building orientation with respect to the viewing direction. "TBD" may indicate view-dependent NPR edges. Whether these edges will be rendered or not may depend on the building orientation with respect to the viewer. These edges may be rendered only when they become silhouette edges, which may be view-dependent.

All FIX edges and partially TBD edges which passed silhouette testing may be rendered using textured billboard or sprites so that the edge can be rendered with a stroke style.

Next, the inventive NPR edge identification algorithm may move on to the post-marking stage. In this stage, the algorithm may identify substructures from the 3D building for the marking, as these substructures may have special requirements for the edge marking. In one embodiment, parallel edges representing a curved surface in pillar-like and archway-like substructures are identified, and these edges may be marked using a TBD label. Finally, merging may be conducted to remove redundant NPR edges for the final output. For each identified NPR edge, the width value for stroke rendering may be calculated as well. The final output of the NPR edge identification algorithm may be identified NPR edges marked with labels of "FIX" or "TBD" and width values.

FIGS. 5a-c illustrate the typical usage of textures with transparency for photorealistic visualization of a 3D landmark. More particularly, FIG. 5a illustrates a polygon mesh having a rectangular transparent edge. FIG. 5b illustrates the case in which the transparent edge is not rendered, and FIG. 5c illustrates the case in which the transparent edge is in fact rendered. Thus, FIGS. 5b-c provide a comparison of the effects when the rendering of transparent edges are disabled and enabled, respectively. Textures with transparency are widely used in 3D building rendering, especially when the building has a buttress, archway, etc. Transparent textures may be very suitable for presenting these complex structures while maintaining the low triangle count for efficiency consideration. However, some triangles in the 3D building mesh could be partially covered by the transparent regions during texture mapping. As a result, some of these edges may become completely or partially transparent and it may be inappropriate for such edges to be simply identified as NPR edges. Otherwise, incorrect shape information may be conveyed, as illustrated by FIGS. 5a-c. It may be advantageous to detect and split transparent edges before sending them to the marking stage.

One embodiment of an inventive algorithm for detecting and splitting transparent edges includes the following steps for each edge:
1. Split the edge into many segments and sample dense texels for each segment.
2. Check if a texel is transparent by its alpha channel.
3. The segment is labeled as transparent if the percentage of transparent texels is greater than a predefined threshold.
4. Discard all transparent segments.
5. If all segments in an edge are detected as non-transparent, the edge will be sent to the next stage.
6. Otherwise, merge all the non-transparent segments to one or several new edges and send them to the next stage.

FIGS. 6a-b illustrates detecting and splitting the transparent edges according to one embodiment of an inventive algorithm. This detecting and splitting of the transparent edges may occur during the pre-marking stage, as described above. More particularly, FIG. 6a illustrates an example of a transparent edge, and FIG. 6b illustrates the splitted result of the transparent edge of FIG. 6a. The transparent edges may be discarded and nontransparent ones may be sent to the next stage.

As shown in FIG. 4, within the pre-marking stage, detecting and splitting transparent edges may be followed by detecting and splitting internal edges. FIG. 7a illustrates internal edges in a 3D landmark mesh; FIG. 7b illustrates a fragmentary rending of the mesh of FIG. 7a in which the internal edge is not rendered; and FIG. 7c illustrates a fragmentary rending of the mesh of FIG. 7a in which the internal edge is in fact rendered. A 3D landmark mesh typically contains many internal edges. FIG. 7c illustrates an example of the visualization artifacts if internal edges are rendered as NPR edges. The effects of photo-realistic rendering are not affected because none of the edges are rendered or highlighted for photorealistic visualization. But internal edges may affect NPR rendering where edges could be highlighted for stylized visualization. As a result, it may be advantageous to detect and split internal edges and send only the visual parts to the marking stage.

One embodiment of an inventive algorithm for detecting and splitting internal edges includes the following steps for each edge:
1. Split the edge into many segments.
2. Test the visibility for each endpoint of the segment by constructing a ray from the center of the mesh to the endpoint. If the ray intersects any face of the mesh after hitting the endpoint, the endpoint is recognized as invisible.
3. The segment is invisible if any of the two endpoints is invisible.
4. Discard all invisible segments.
5. If all segments in an edge are detected as visible, the edge will be sent to the next stage.
6. Otherwise, merge all visible segments to a new edge and send to the next stage.

Figures 8A, 8B, 8C:
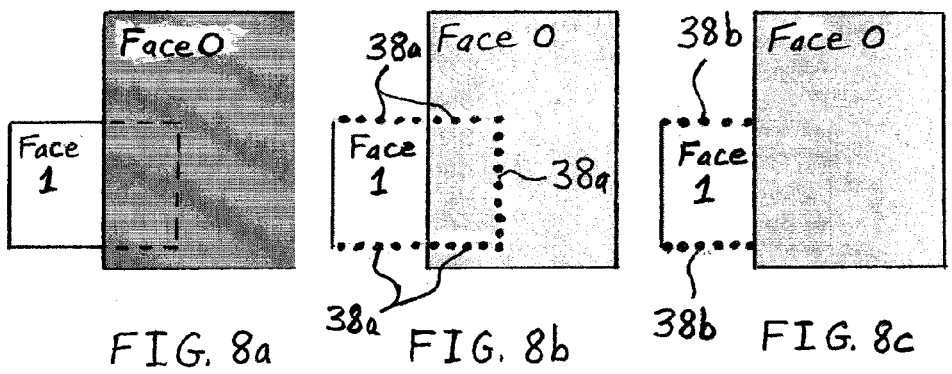
FIG. 8a illustrates an example of one face of a structure being partially occluded by another face of the structure.
FIG. 8b illustrates the internal edges of the partially occluded face of FIG. 8a before splitting.
FIG. 8c illustrates the internal edges of the partially occluded face of FIG. 8a after splitting.

FIGS. 8a-c illustrate the results of the detecting and splitting of internal edges in the Pre-marking stage. The invisible segments of edges may be discarded and the visible ones may be sent to the next stage. More particularly, Face 0 and Face 1 may be two faces of a structure that is being rendered. As shown in FIG. 8a, the part of Face 1 depicted by dashed lines is occluded by Face 0. The edges of Face 1 in FIG. 8a that are at least partially occluded or hidden may be referred to as "internal edges," and are depicted in dotted lines and by reference number 38a in FIG. 8b. FIG. 8b shows internal edges 38a as they are before splitting; and FIG. 8c shows internal edges 38b as they are after splitting.

Figure 9A:
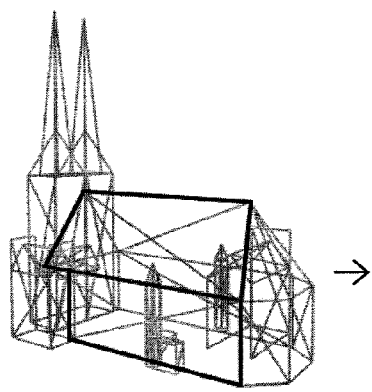
FIG. 9a illustrates an example of a mesh polygon having irregular topology.
Figure 9B:
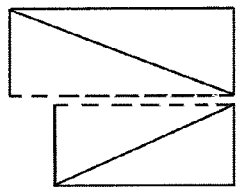
Figure 9C:
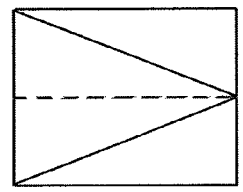
FIG. 9c illustrates an example of a regular or ideal topology in which two faces share one edge.

The final phase of the Pre-marking stage, building a Complete Half-Edge Structure (CHES), may be described in more detail with reference to FIGS. 9a-c. Ridges and valleys in a 3D model may be important cues for people to understand the shape information. In nonphotorealistic rendering, edges along ridges and valleys are usually regarded as important edges. To identify those edges, most existing algorithms check the value of a dihedral angle between the two adjacent faces of each edge. For regular geometry surfaces, the two adjacent faces of an edge can be easily found by constructing a half-edge data structure. In the present invention, as the building geometry is typically modeled by separate parts including walls, roofs, pillars, etc., the building topology can be quite irregular. FIGS. 9a-c present an example where the two visually adjacent faces share more than one edge. Or a single edge can also have more than two adjacent faces. As a result, traditional half-edge structure may be augmented to handle these cases, and such an augmented data structure may be referred to as CHES. More particularly, FIG. 9a illustrates an example of a mesh polygon having irregular topology; FIG. 9b illustrates two border edges of the irregular topology of FIG. 9a; and FIG. 9c illustrates an example of a regular or ideal topology in which two faces share one edge.

One embodiment of an inventive algorithm for building CHES for 3D landmarks includes the following steps:

A. Build traditional half-edge data structure
B. For each edge:
1. Determine the edge's border edge pair. A border edge is an edge that has only one adjacent face, such as edge 40 or edge 42 in FIG. 10*a*. A border edge pair contains two border edges that "touch" each other, such as edge 40 and edge 42 in FIG. 10*a*. A border edge pair may satisfy the following conditions:
   a. Both two edges are border edges.
   b. The two edges are parallel to each other. Thus, edges 44, 46 in the case illustrated in FIG. 11*a* will be filtered out.
   c. The two edges are close to each other. Thus, edges 48, 50 in the case illustrated in FIG. 11*b* will be filtered out.
   d. The two edges should be overlapped. Thus, edges 52, 54 in the case illustrated in FIG. 11*c* will be filtered out.
2. Merge the border edge's adjacent faces into one group. Any face adjacent to one of the edges will be referenced by both edges.

Figure 10A:
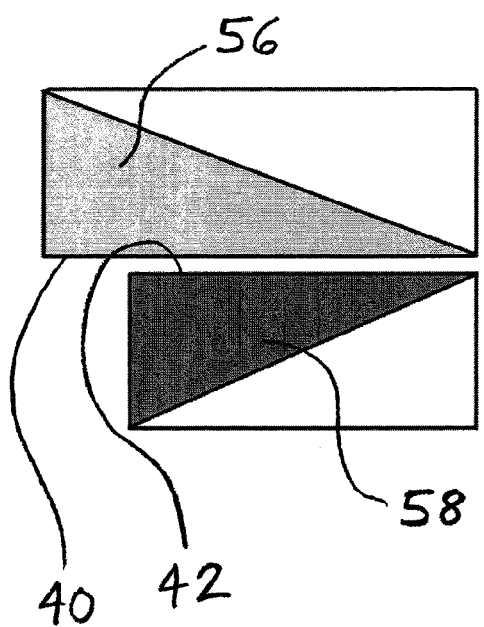
FIG. 10a illustrates a CHES structure before CHES construction.
Figure 10B:
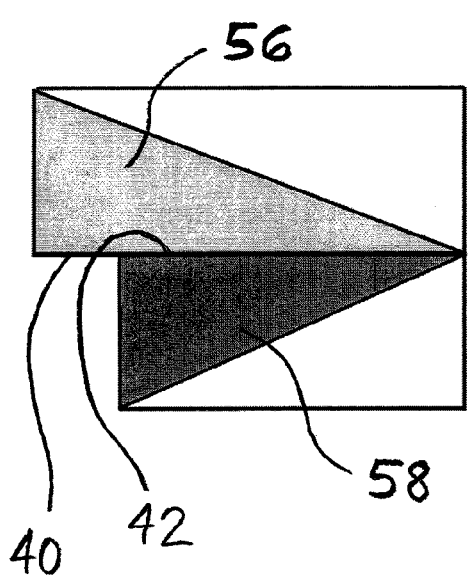
FIG. 10b illustrates a CHES structure after CHES construction.
Figure 11A:
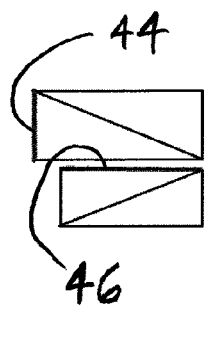
FIG. 11a illustrates one example pair of edges in a CHES construction.
Figure 11B:
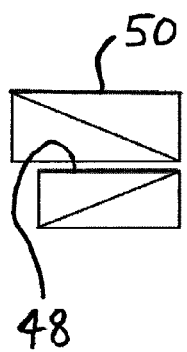
FIG. 11b illustrates another example pair of edges in a CHES construction.
Figure 11C:
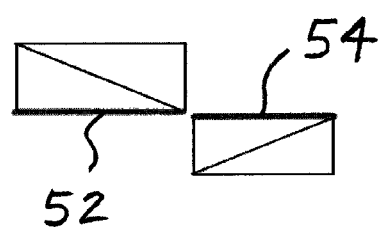
FIG. 11c illustrates yet another example pair of edges in a CHES construction.

Once CHES is constructed, all faces adjacent to an edge are added to the edge's adjacent face group. FIG. 10*a* illustrates CHES structure before performing the CHES construction. Edge 40 is linked to triangular face 56, and edge 42 is linked to triangular face 58. FIG. 10*b* illustrates CHES structure after performing the CHES construction. Edge 40 is linked to both triangular faces 56, 58, and edge 42 is also linked to both triangular faces 56, 58.

Figure 12:
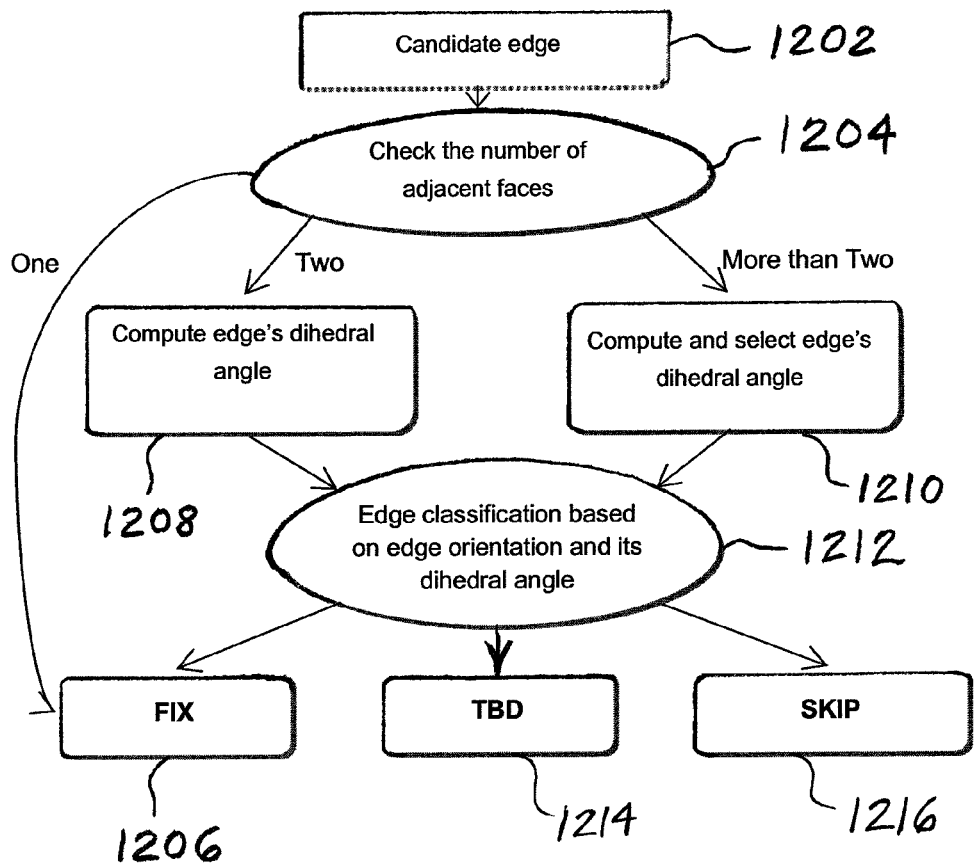
FIG. 12 is a flow chart of one embodiment of the marking stage of the NPR edge identification algorithm of FIG. 4.

FIG. 12 is a flow chart summarizing the marking stage of the NPR edge identification algorithm of FIG. 4. Based on CHES, the label for each candidate edge will not be determined (step 1202) until some testing operations are done. First, the number of adjacent faces for each edge is checked (step 1204). If there is only one face in the group, then the edge is a border edge, whose label will be marked as "FIX" (step 1206). If, however, there are two adjacent faces in the group, then the edge's dihedral angle will be calculated (step 1208) based on the normal of these two faces using the following Equation (1):

$$\text{Dihedral (Radian)} = \pi - a\cos(\text{dot}(n0, n1))$$

Figure 13A:
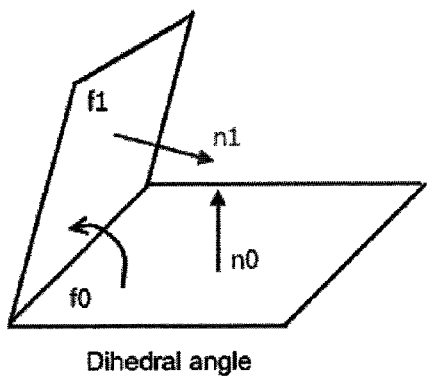
FIG. 13a is a perspective view illustrating computation of a dihedral angle according to one embodiment of the invention.
Figure 13B:
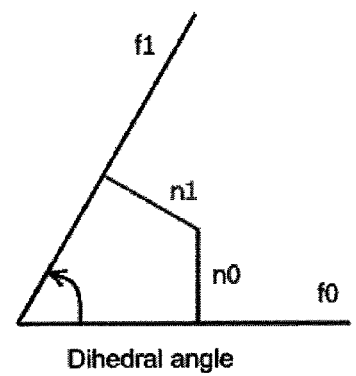

FIGS. 13*a-b* illustrate one embodiment of a method of computing a dihedral angle based on two faces. The normals for faces f0 and f1 are designated as n0 and n1, respectively.

If there are more than two faces in the group, then the minimal dihedral angle of every two faces will be selected as the edge's dihedral angle (step 1210). Based on the dihedral angle and orientation of each edge, the label of the edge can be determined by applying rules in the table in FIG. 14 (step 1212). Compared with other edges, vertical and horizontal edges in a 3D building may be more important to convey the 3D shape information. Therefore, specific marking rules or parameters may be used for different types of edges, as shown in FIG. 14. According to the table of FIG. 14, edges may be marked as "FIX" (step 1206) or "TBD" (step 1214) as described above, or as "SKIP" (step 1216) if neither the conditions for neither being marked as "FIX" nor the conditions for neither being marked as "TBD" are met.

As shown in FIG. 4, the Post-marking stage may include identifying building substructures for marking updates. FIG. 15*a* illustrates a rendering of a pillar structure in a 3D landmark building. Several pillars 60 are shown, and such pillars are a common substructure in a 3D landmark building. FIG. 15*b* is a 3D landmark polygon mesh based upon the rendering of FIG. 15*a*; and FIG. 15*c* is a 3D polygon mesh of a pillar included in the mesh of FIG. 15*b*. Among all the vertical edges in a pillar, only those that become silhouette edges under the current viewpoint may be highlighted during rendering. For example, vertical edges 62*a-b* in FIG. 15*c* are silhouette edges that form the outline of the pillar. As a result, all these edges may be labeled as "TBD." It may be necessary to identify typical building substructures automatically and update the marking based on the type of the substructure. The problem of finding pillars may be formulated as a clustering problem. To apply a typical clustering algorithm such as K-Means algorithms, a similarity metric may be defined to quantify the distance between two vertical pillar edges. The distance metrics may include the distance between two line segments and the length difference. After the clustering, all 3D landmarks' vertical edges may be clustered into different groups representing an individual edge or a pillar.

Merging and cleaning may be an important step in the post-marking stage for the purpose of efficiency. Some NPR edges detected during the marking stage may be parallel and adjacent to each other. Some can overlap with each other fully or partially. For these edges, they can be either rendered individually or rendered as one single edge after merging. The latter choice may be preferable because the same visualization effects may be achieved while reducing the number of NPR edges rendered. Therefore, the rendering performance may be greatly improved.

The edges that satisfy all the following conditions may be merged, as illustrated in FIGS. 16*a-b*.
1) Edges are previously marked with a "FIX" label.
2) Edges overlap with each other fully or partially, including adjacent cases.

After merging, cleaning may be performed. In comparison with the scale of a landmark model, some NPR edges may be relatively too short. Removing short edges may not significantly change the visual quality of NPR rendering, but can enhance the rendering performance. Thus, in one embodiment, any NPR edge whose length is shorter than a threshold SHORT_LEN_SCALE×MODEL_SCALE may be removed, wherein SHORT_LEN_SCALE is a predefined parameter and MODEL_SCALE is computed based on the following formula:

$$\text{MODEL\_SCALE} = 0.5 \times ((BL + BW + BH) - \min(BL, BW, BH))$$

where BL, BW and BH represent the length, width and height of the entire model's bounding box.

Figure 17:
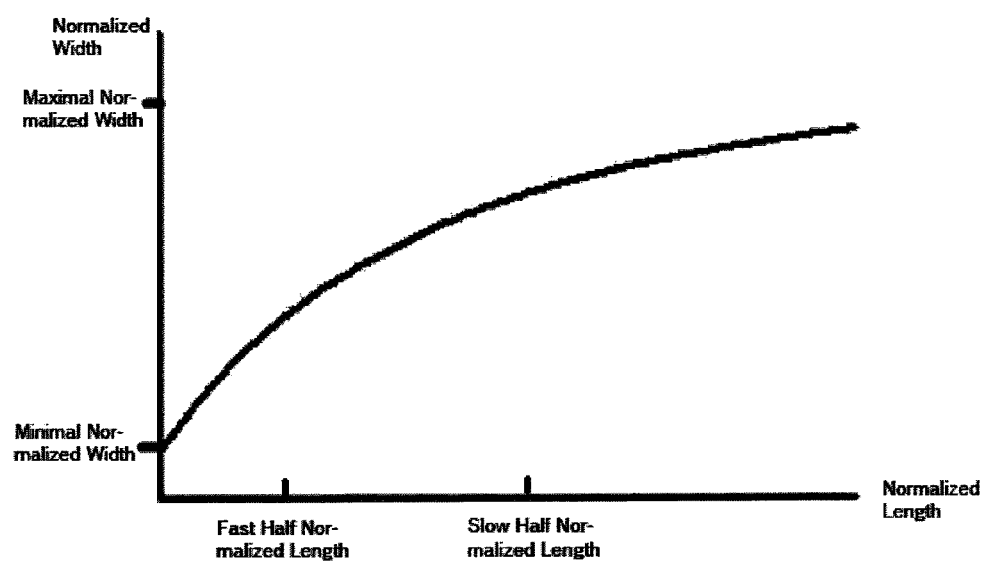
FIG. 17 is a plot of a relationship between width and length for an NPR edge.

The next step of the post-marking stage may be computing the width of the NPR edges. NPR edges detected in previous stages may be rendered by using billboards (a texture-mapped rectangle) where the width of the billboard may need to be computed. In this process, a texture-mapped billboard (representing a stroke) may be allowed to rotate around the underlying NPR edge. The length of the billboard may be equal to the length of the underlying NPR edge whereas the width may need to be carefully computed so that the manual drawing effects of a stroke can be achieved. The width of the billboard may be determined based on two observations. First, the billboard width should increase with its length. As a result, the function of computing the width should be a monotonically increasing function of the length. Second, it may be desirable for the width of the billboard to grow in a nonlinear way. The width of the billboard should grow faster when the length of the NPR edge is smaller, and slower when the length is larger. As a result, short edges may still have a perceivable stroke width, while longer edges may not be assigned a very large width value during rendering. Based on the above two observations, a two-phase width function may be designed. The plot of FIG. 17 illustrates a relationship between normalized width and normalized length, which may be described further by the following equations:

$$NormalizedLength = Length/ModelScale$$

$$NormalizedWidth = MinimalNormalizedWidth + SpanFast \times (1-\exp(-KFast \times NormalizedLength)) + SpanSlow \times (1-\exp(-KSlow \times NormalizedLength))$$

$$Width = NormalizedWidth \times ModelScale$$

where $$SpanFast = (MaxNormalizedWidth - MinNormalizedWidth) \times percentageFast$$

$$SpanSlow = (MaxNormalizedWidth - MinNormalizedWidth) \times (1 - percentageFast)$$

MinimalNormalizedWidth and MaximalNormalizedWidth are adjustable parameters to control the lower and upper bound for an NPR edge's normalized width (with respect to ModelScale). PercentageFast is the parameter that separates the fast and slow growing regions. KFast and KSlow are two rate constants. Fast half and slow half normalized length may be computed as $\ln(2)/K$.

Figure 18:
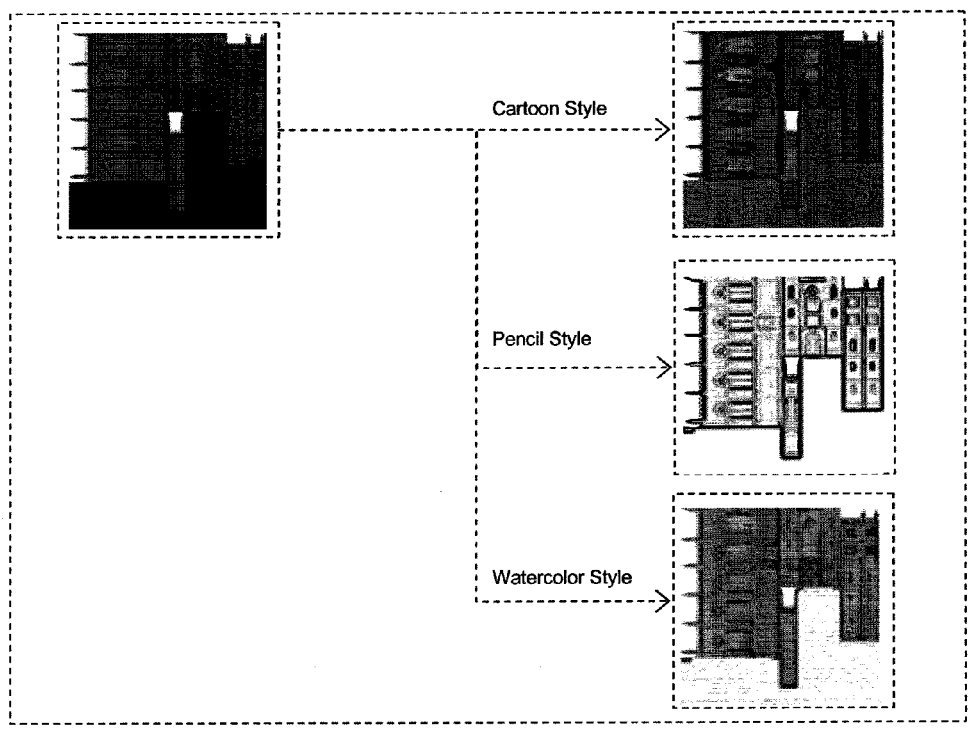
FIG. 18 is an illustration of various NPR styles that may be enhanced from the original two-dimensional texture.

With the first component (automatic identification of important edges for NPR rendering) of the inventive method complete, the second component, NPR texture enhancement, may be performed. FIG. 18 illustrates different NPR styles that may be enhanced from the original 2D texture. The NPR texture enhancement may be defined to take an original photorealistic texture in the raw landmark data as the input and convert it into textures with different NPR styles. Various standard image processing techniques can be employed to accomplish this task. A third party image processing software (e.g., Adobe® Photoshop®) can also be used for this purpose.

The present invention as described above includes several novel features. The invention may provide a method of reusing photorealistic 3D landmarks for nonphotorealistic 3D maps. The invention may also provide an algorithm (e.g., consisting of a set of sub algorithms and data organization method Complete Half Edge Structure CHES) that can identify NPR edges automatically from 3D building data that contain various kinds of structures other than a water-tight surfaces.

Figure 19:
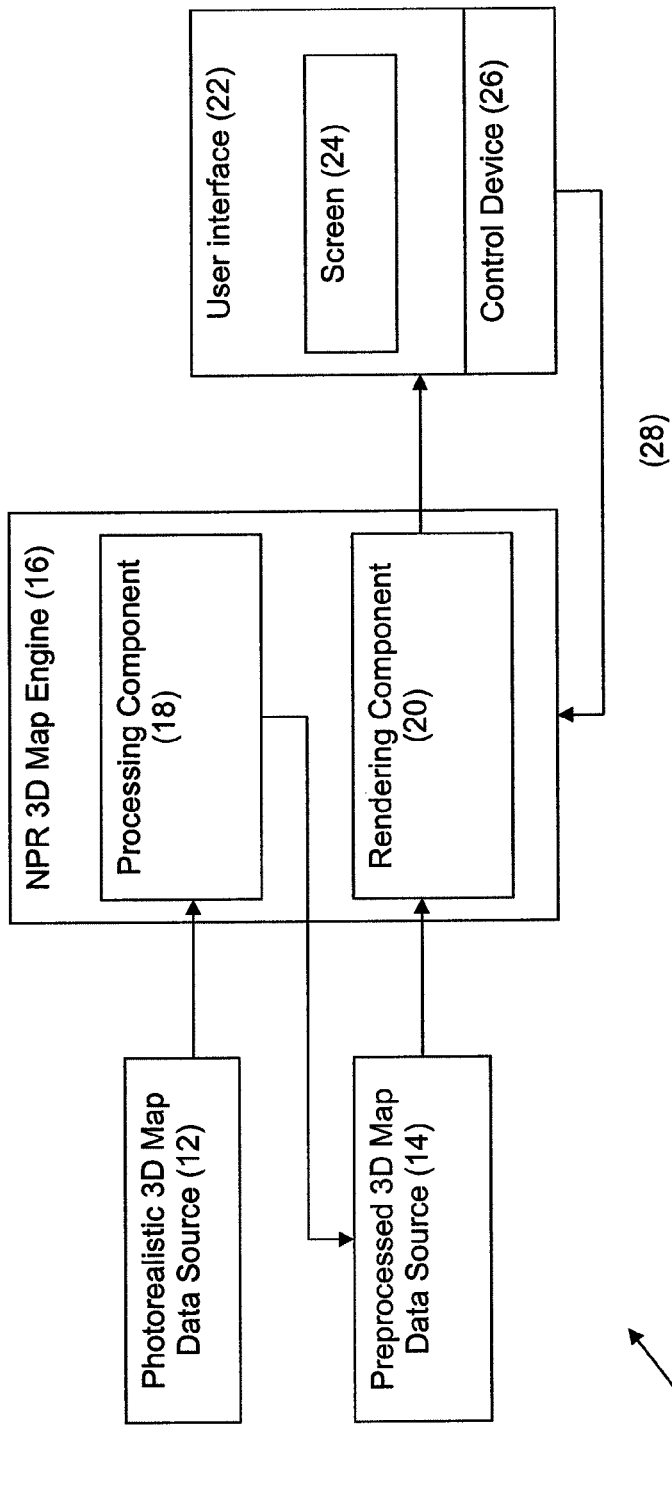
FIG. 19 is a block diagram of one embodiment of a 3D map rendering arrangement of the present invention.

In FIG. 19 there is shown one embodiment of a 3D map rendering arrangement 10 of the present invention that may be associated with a vehicle, such as an automobile, boat, airplane, etc. That is, arrangement 10 may be installed in-vehicle.

Arrangement 10 may include a preprocessed 3D photorealistic map data source 14, an NPR 3D map engine 16, and a user interface 22. Photorealistic 3D map data source 12 will be preprocessed by NPR 3D map engine processing component 18 and turned into preprocessed 3D map data source 14. Preprocessed 3D map data source may be in the form of a compact disc (CD) or other memory device. Alternatively, preprocessed 3D map data may be wirelessly transmitted by a central transmitter (not shown) to a large number of vehicles that each has a respective 3D map rendering arrangement 10. Such wireless transmissions may be received by NPR 3D map engine rendering component 20.

Preprocessed 3D map data source 14 may also include a global positioning system (GPS) module (not shown) for determining the global location coordinates of the vehicle in real time. Based on the current location of the vehicle, corresponding 3D map data that is of interest to people within the vehicle is identified and provided to the online rendering component 20 in NPR 3D Map Engine 16.

NPR 3D engine 16 may include a standard electronic process and consist of two components, offline processing component 18 and online rendering component 20. Processing component 18 may preprocess the photorealistic 3D map data from source 12 offline. Rendering component 20 may generate a nonphotorealistic image from the preprocessed 3D map data source 14 online. The nonphotorealistic image may be in various styles, such as cartoon, pencil sketches, pen-and-ink illustrations, oil painting effects, and other painterly styles. The NPR renderings may depict surfaces of objects and distinctive or well-known features of the objects.

Figure 20:
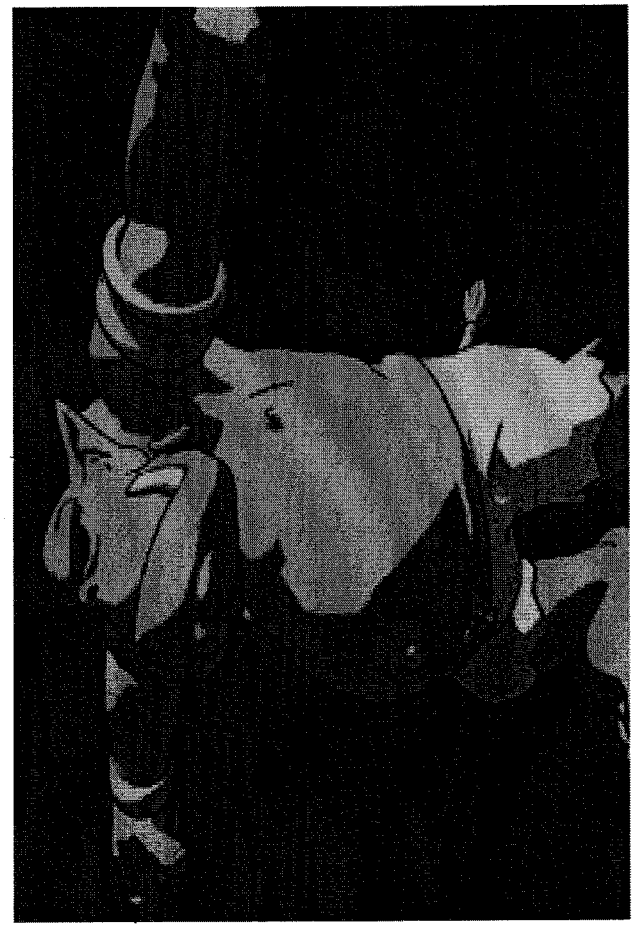
FIG. 20 is an example cartoon style rendering technique for scalable real-time 3D animation that may be suitable for use in at least some embodiments of a 3D map rendering method of the present invention.
Figure 21:
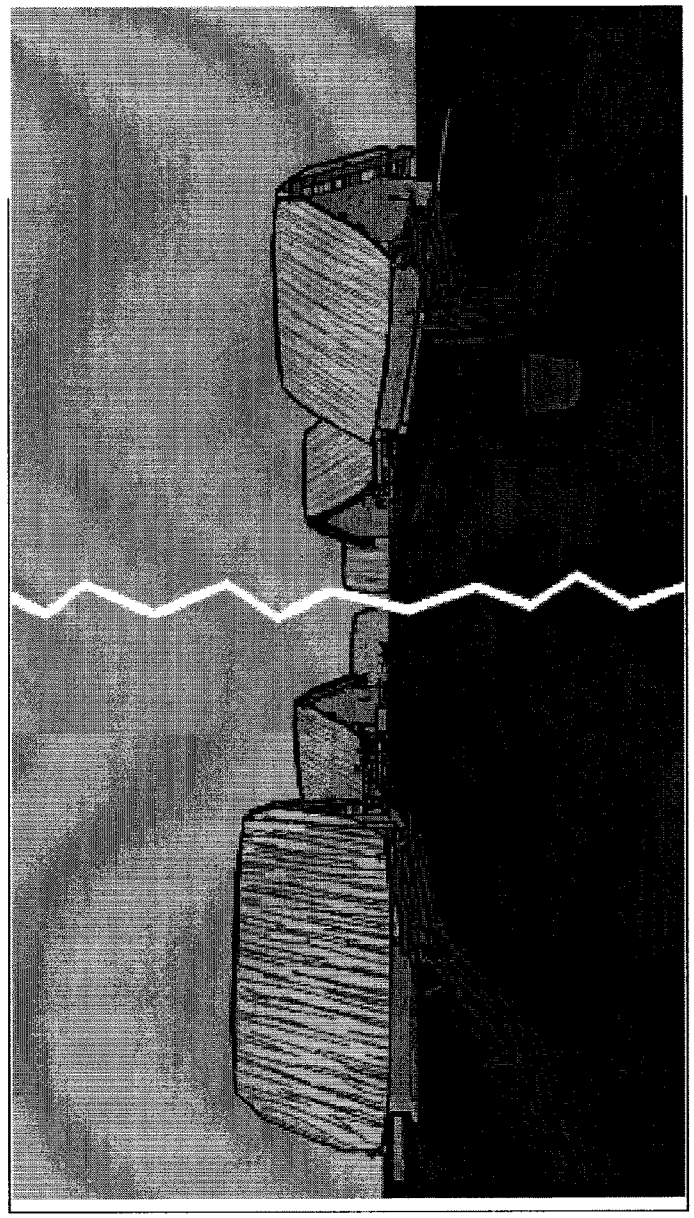
FIG. 21 is an example pen-and-ink style rendering that may be suitable for use in at least some embodiments of a 3D map rendering method of the present invention.
Figure 22:
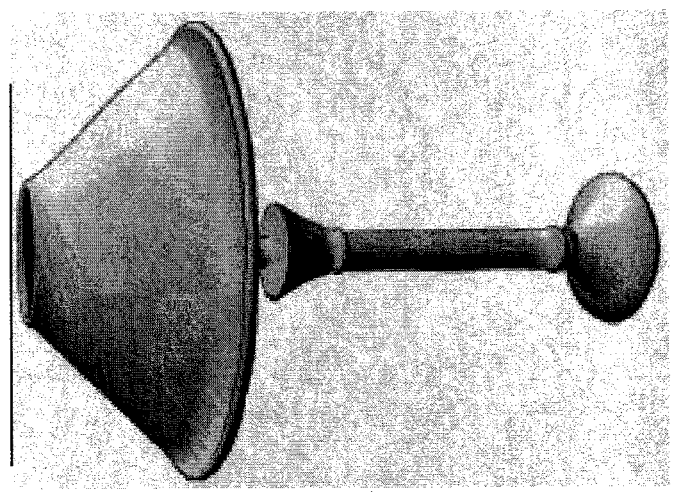
FIG. 22 is an example pencil rendering that may be suitable for use in at least some embodiments of a 3D map rendering method of the present invention.
Figure 23:
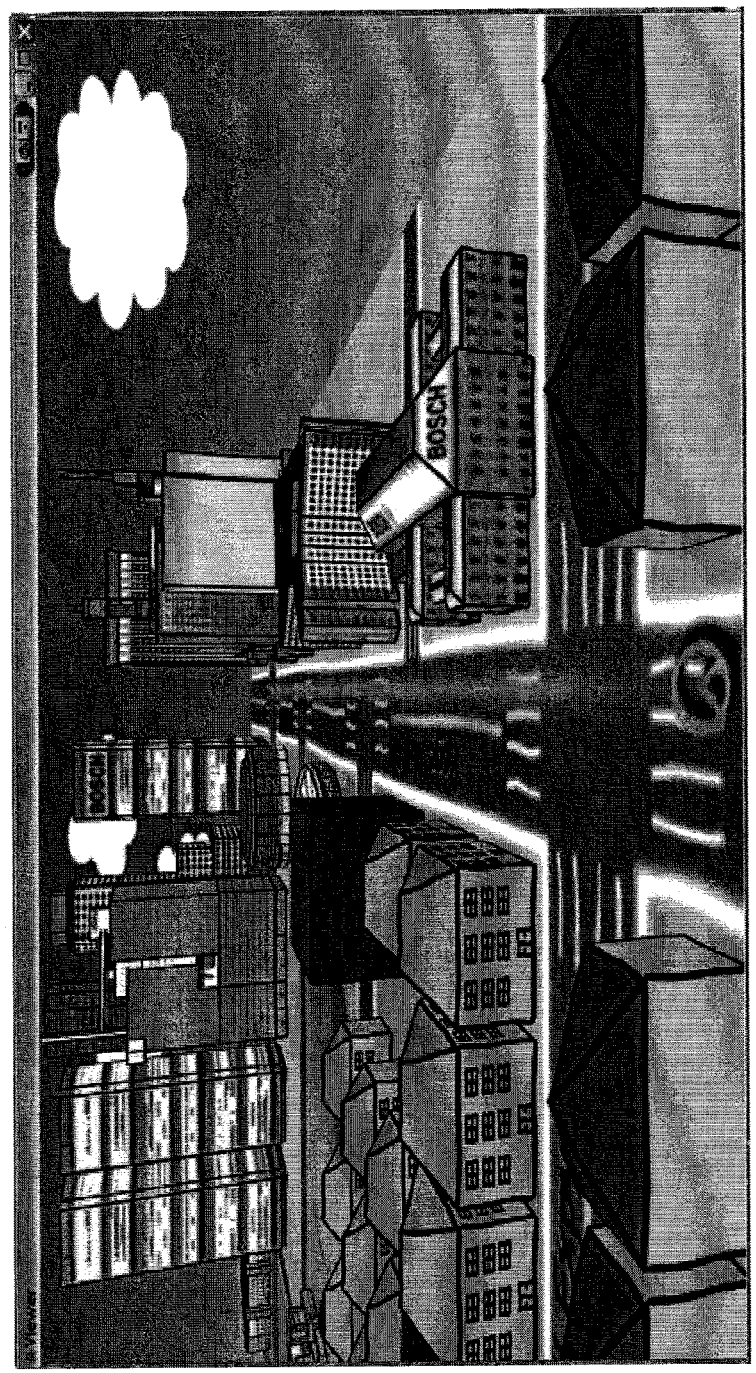
FIG. 23 is an example cartoon style rendering that may be suitable for use in at least some embodiments of a 3D map rendering method of the present invention.

FIGS. 20-23 illustrate various NPR styles that have not been applied to the navigation domain in the prior art. Each of these styles in FIGS. 20-23 may be suitable for use in conjunction with NPR 3D map rending methods of the present invention. More particularly, FIG. 20 illustrates a cartoon-like stylized rendering technique for scalable real-time 3D animation; FIG. 21 illustrates a pen-and-ink rendering; FIG. 22 illustrates a real-time pencil rendering; and FIG. 23 illustrates a cartoon-style NPR 3D map that is an example of an NPR 3D map that may be rendered by the present invention.

In one embodiment, the user may be able to adjust the angle of view depicted in FIG. 23 to any viewing angle or any location at ground level or above. For example, the user may choose among a nearly infinite number of views along a 360 degree arc around any or all of the buildings. Further, the user may choose any downward viewing angle along a vertical plane.

User interface 22 may be disposed on a dashboard of a vehicle and may include a display screen 24 and a control device 26. Display screen 24 may include a processor and memory for controlling the information or content that is displayed on the screen or monitor. Generally, display screen 24 may present or depict NPR 3D image data received from rendering component 20.

Control device 26 may be in the form of a dial, knob, set of pushbuttons, joystick, microphone, touch interface, or any combination of the above. A user may use control device 26 to provide feedback 28 to engine 16. Feedback 28 may instruct engine 16 to produce another set of image data (e.g., image data depicting another scene, object or set of objects). Alternatively, feedback 28 may instruct engine 16 to change the viewing angle at which a current set of image data is being viewed. The viewing angle may vary from an overhead bird's-eye view of the surroundings to an angle looking up at buildings, or at other landmarks, from a ground level or street level.

Figure 24:
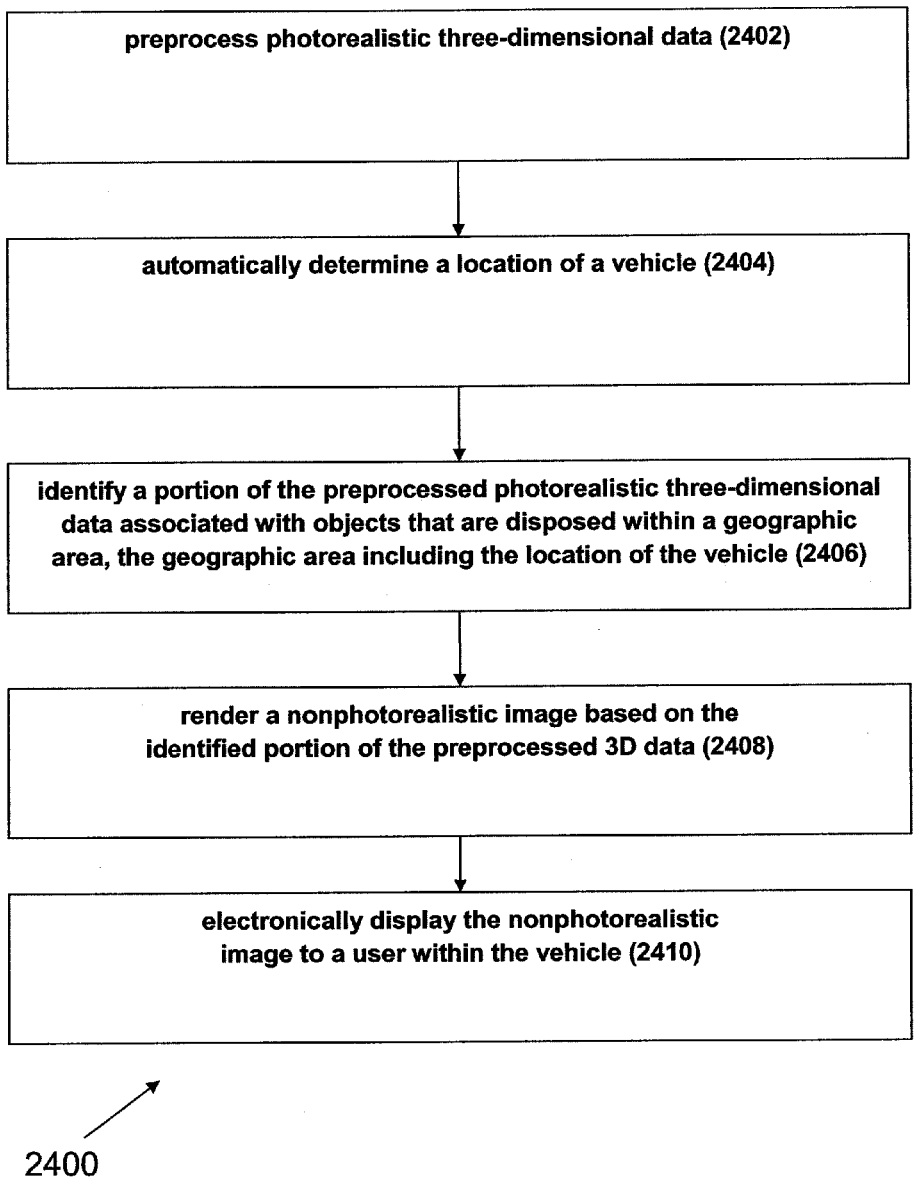
FIG. 24 is a flow chart of one embodiment of a method of the present invention for displaying a navigation map.

An embodiment of a method 2400 of the present invention for displaying a navigation map is illustrated in FIG. 24. In a first step 2402, the photorealistic three-dimensional data are preprocessed and stored.

In a next step 2404, a location of a vehicle is automatically determined. For example, the arrangement of FIG. 19 may include a GPS or other device that automatically and continuously updates a current location (which may be expressed in global coordinates) of a vehicle associated with the arrangement.

Next, in step 2406, a portion of the preprocessed three-dimensional data associated with landmarks that are disposed within a geographic area of the vehicle is identified. For example, based on the vehicle location determined in step 2404, map data associated with the vicinity of the vehicle may be retrieved from a memory device, such as a CD. Alternatively, the map data associated with the vicinity of the vehicle may be wirelessly received from a central repository of map data. Regardless of how it is received and/or identified, the map data may include 3D data describing the shape, dimensions, colors and windows of the buildings and natural landmarks within the vicinity of the vehicle.

Next, in step 2408, a nonphotorealistic image is rendered based on the identified portion of the preprocessed 3D map data. FIGS. 20-23 illustrate examples of nonphotorealistic styles in which the image may be rendered.

In a final step 2410, the nonphotorealistic image is electronically displayed to the user within the vehicle. In one embodiment, the NPR image rendered by engine 16 is displayed on a screen 24 of a user interface 22.

While this invention has been described as having an exemplary design, the present invention may be further modified within the spirit and scope of this disclosure. This application is therefore intended to cover any variations, uses, or adaptations of the invention using its general principles.

What is claimed is:

1. A 3D landmark data processing method comprising the steps of:
   automatically determining a location of a vehicle;
   wirelessly transmitting the location of the vehicle to a centralized provider of photorealistic three-dimensional data;
   detecting and splitting transparent edges and internal edges of objects in the three-dimensional photorealistic data;
   use non-transparent edges, non-internal edges and the split edges of the objects in the photorealistic data to construct a Complete Half Edge Structure;
   for each of the edges in the Complete Half Edge Structure, either discard the edge, mark the edge as a view-independent edge, or mark the edge as a view-dependent edge;
   identify a plurality of substructures within the Complete Half Edge Structure;
   update the marking of at least one of the substructures based on a type of the substructure;
   merge redundant ones of the edges in the Complete Half Edge Structure to thereby produce a final set of nonphotographically rendered edges;
   compute a width value for each of the edges in the final set;
   converting photorealistic texture in the photorealistic data into nonphotorealistic texture;
   produce a nonphotorealistic image of the object based upon the nonphotorealistic texture, the final set of nonphotographically rendered edges, the markings of each of the edges in the final set, and the width value for each of the edges in the final set, each of the edges in the final set being marked as either a view-independent edge or a view-dependent edge, wherein the photorealistic three-dimensional data associated with the object is preprocessed and wirelessly transmitted from the centralized provider to the vehicle; and
   electronically displaying the nonphotorealistic image to a user within a vehicle, the user being within sight of the object.

2. The method of claim 1 wherein each of the edges that are marked as either a view-independent edge or as a view-dependent edge, and that have more than one adjacent face, are marked dependent upon at least one of the edge's orientation and dihedral angle.

3. The method of claim 1 further comprising, after the merging, discarding ones of the edges in the Complete Half Edge Structure having a length less than a threshold length.

4. The method of claim 1 wherein the construction of the Complete Half Edge Structure includes merging adjacent border edges.

5. A 3D landmark data processing method comprising the steps of:
   automatically determining a location of a user;
   wirelessly transmitting the location of the user to a centralized provider of photorealistic three-dimensional data;
   detecting and splitting transparent edges and internal edges of objects in the three-dimensional photorealistic data;
   using non-transparent edges, non-internal edges and the split edges of the objects in the photorealistic data to construct a Complete Half Edge Structure;
   for each of the edges in the Complete Half Edge Structure, either discarding the edge, marking the edge as a view-independent edge, or marking the edge as a view-dependent edge;
   identifying a plurality of substructures within the Complete Half Edge Structure;
   updating the marking of at least one of the substructures based on a type of the substructure;
   merging redundant ones of the edges in the Complete Half Edge Structure to thereby produce a final set of nonphotographically rendered edges;
   computing a width value for each of the edges in the final set;
   converting photorealistic texture in the photorealistic data into nonphotorealistic texture;
   producing a nonphotorealistic image of the object based upon the nonphotorealistic texture, the final set of nonphotographically rendered edges, the markings of each of the edges in the final set, and the width value for each of the edges in the final set, each of the edges in the final set being marked as either a view-independent edge or a view-dependent edge, wherein the photorealistic three-dimensional data associated with the object is preprocessed and wirelessly transmitted from the centralized provider to the vehicle; and
   electronically displaying the nonphotorealistic image to the user, the user being within sight of the object.

6. The method of claim 5 wherein the construction of the Complete Half Edge Structure includes merging adjacent border edges.

7. The method of claim 5 wherein each of the edges that are marked as either a view-independent edge or as a view-dependent edge, and that have more than one adjacent face, are marked dependent upon the edge's orientation and/or dihedral angle.

8. The method of claim 5 further comprising, after the merging, discarding ones of the edges in the Complete Half Edge Structure having a length less than a threshold length.

9. A 3D landmark data processing method comprising the steps of:
   wirelessly transmitting a location of a vehicle to a centralized provider of photorealistic three-dimensional data;
   detecting and splitting transparent edges and internal edges of objects in the three-dimensional photorealistic data;
   using non-transparent edges, non-internal edges and the split edges of the objects in the photorealistic data to construct a Complete Half Edge Structure;
   for each of the edges in the Complete Half Edge Structure, either discarding the edge, marking the edge as a view-independent edge, or marking the edge as a view-dependent edge;
   identifying a plurality of substructures within the Complete Half Edge Structure;
   updating the marking of at least one of the substructures based on a type of the substructure;

merging redundant ones of the edges in the Complete Half Edge Structure to thereby produce a final set of nonphotographically rendered edges;

computing a width value for each of the edges in the final set;

converting photorealistic texture in the photorealistic data into nonphotorealistic texture; and producing a nonphotorealistic image of the object based upon the nonphotorealistic texture, the final set of nonphotographically rendered edges, the markings of each of the edges in the final set, and the width value for each of the edges in the final set, each of the edges in the final set being marked as either a view-independent edge or a view-dependent edge, wherein the photorealistic three-dimensional data associated with the object is preprocessed and wirelessly transmitted from the centralized provider to the vehicle.

10. The method of claim 9 comprising the further step of electronically displaying the nonphotorealistic image to a user within the vehicle.

11. The method of claim 9, wherein the user is within sight of the object.

12. The method of claim 9 comprising the further step of automatically determining the location of the vehicle.

13. The method of claim 9 wherein the construction of the Complete Half Edge Structure includes merging adjacent border edges.

14. The method of claim 9 wherein each of the edges that are marked as either a view-independent edge or as a view-dependent edge, and that have more than one adjacent face, are marked dependent upon the edge's orientation and/or dihedral angle.

15. The method of claim 9 further comprising, after the merging, discarding ones of the edges in the Complete Half Edge Structure having a length less than a threshold length.

* * * * *